United States Patent [19]

Fechter

[11] 3,747,117

[45] July 17, 1973

[54] LASER WRITING

[75] Inventor: Henry G. Fechter, Skokie, Ill.

[73] Assignee: Teletype Corporation, Skokie, Ill.

[22] Filed: Mar. 31, 1971

[21] Appl. No.: 129,748

[52] U.S. Cl. .................... 346/1, 346/76 L, 346/135

[51] Int. Cl. .......................................... G01d 15/34

[58] Field of Search ...................... 346/135, 76 L, 1

[56] References Cited

UNITED STATES PATENTS

| | | | |
|---|---|---|---|
| 2,808,345 | 10/1957 | Traub | 346/135 X |
| 2,992,875 | 7/1961 | Kinley | 346/135 X |
| 3,256,524 | 6/1966 | Stauffer | 346/76 |
| 3,262,122 | 7/1966 | Fleisher et al. | 346/1 |
| 3,365,706 | 1/1968 | King | 340/173 |
| 3,429,991 | 2/1969 | Ortlieb | 346/135 U X |
| 3,438,050 | 4/1969 | Aschenbrenner | 346/108 X |
| 3,465,352 | 9/1969 | Carlson et al. | 346/76 |
| 3,526,542 | 9/1970 | Wiese et al. | 117/216 |

*Primary Examiner*—Joseph W. Hartary
*Attorney*—J. L. Landis and R. P. Miller

[57] ABSTRACT

Monochromatic output of a laser is focused on a plurality of areas of a recording medium of aluminum oxide which has a color complementary to the color of the laser output to maximize energy absorption. The exposure period is sufficient for sintering or vitrifying the aluminum oxide, thereby to generate in the recording medium a plurality of encoding spots with greater light permeability than that of unexposed medium.

The colored medium is bonded as a cover on a transparent substrate to provide a carrier. It is formed by: (1) first applying aluminum to the transparent substrate, (2) then oxydizing the aluminum on the substrate by anodization, using sulfuric acid as electrolyte to spongify the aluminum oxide and thereby to maximize the dye absorptive property thereof, (3) thereafter, immersing the product in a dye solution for coloring the aluminum oxide, and (4) finally fixing the dye in the aluminum oxide.

2 Claims, 2 Drawing Figures

INVENTOR
HENRY G. FECHTER

BY Sherman P. Appel
ATTORNEY

LASER WRITING

FIELD OF THE INVENTION

The present invention relates to intelligence recordal. Particularly it relates to writing with laser output.

BACKGROUND OF THE INVENTION

Generally in this art, a composition is responsive to laser output for producing an intelligence record. In a first heretofore known process related to the present invention, a dye as a recording medium which has been applied directly on a transparent substrate decomposes to a colorless circle upon exposure to a focused laser beam. In another heretofore known and related process, colorless circles are generated by voltilization with a focused laser beam of areas of a metal coat as a recording medium on a transparent substrate.

While these processes are quite effective for generating records, widespread use thereof has been stalled because of shortcomings of materials. For example, heretofore known carriers are considered disadvantageous because their recording media scratch easily, adhere only fairly, at best, to substrates, and tend to flake or peel therefrom. Moreover, if the recording medium is a dye, its uniform application is obtainable uneconomically. If the recording medium is an inexpensive metal, it is poorly absorbent of laser produced energy; and consequently attendant process costs will be high as much of the energy will be dissipated by conduction or reflection from the writing site. On the other hand, if the recording medium is a metal which is highly absorbent of laser output, it is impractical in an economic sense for wide use.

It is an object of the present invention to improve laser writing.

It is another object of the invention to minimize the cost of laser writing.

It is a further object of the invention to provide an improved carrier for records, particularly those produced by laser writing.

It is an additional object of the invention to improve recording media for producing real images.

It is a yet further object of the invention to maximize intelligence density in a record.

SUMMARY OF THE INVENTION

The foregoing, and other objects which will become more apparent from the ensuing detailed description, are effected, in accordance with one aspect of the invention, in a carrier for records adapted for an intelligence pattern written with chromatic output of a laser in a recording medium supported from a substrate and characterized in that the recording medium is a metal oxide. According to another aspect of the invention, a carrier for records is formed by applying a layer of metal as a cover on a substrate. The metal is oxidized; and the oxide is colored for absorbing a high level of the output of a laser. According to yet another aspect of the invention, a record is made by generating a monochromatic laser output. Then the laser output is focused on a metal oxide colored complementarily to the color of the laser output. Then selected areas of the metal oxide are exposed to the laser output for a period sufficient to sinter the metal oxide in the exposed areas.

BRIEF DESCRIPTION OF THE DRAWINGS

In the ensuing detailed description, reference is had to the accompanying drawings in which.

DETAILED DESCRIPTION OF THE INVENTION

Figure 1:
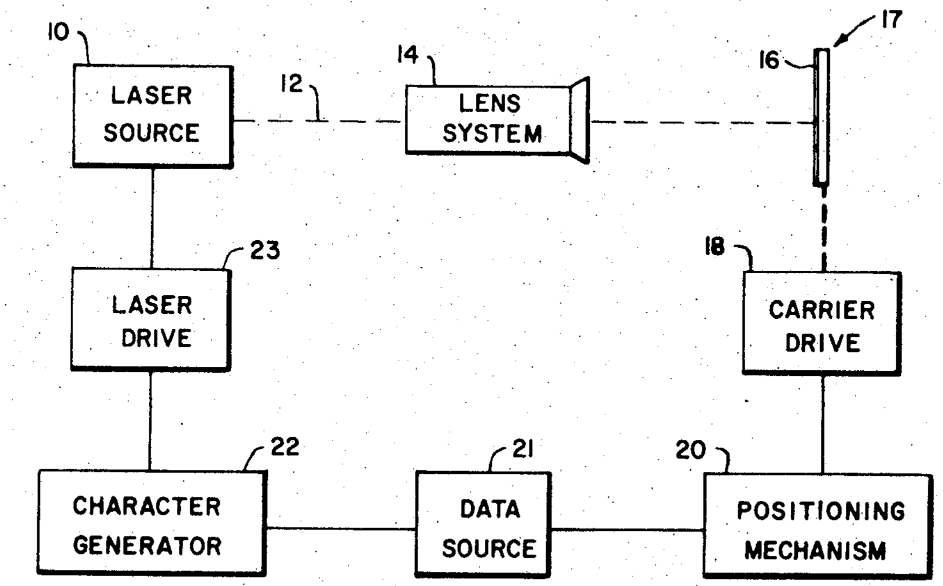
FIG. 1 is a scheme of apparatus for laser writing according to the present invention.

Having reference now to FIG. 1, shown is a laser source 10, the output of which provides a preferably monochromatic laser beam along an optical axis 12. The laser source may be a gas laser or a solid state laser, such as a ruby rod, that is energized by a flash tube, as is well known in the art. The laser beam is directed through a coaxially aligned optical lens system 14 to be focused on the recording medium 16 of carrier 17 for records. The carrier is supported in a fashion which may be conventional for movement in a path perpendicular to the optical axis and is mechanically coupled to a carrier drive 18 adapted for moving the carrier along said path whereby relative movement may be effected between the carrier and the laser beam.

Carrier drive 18 may include a drive motor (not shown) which is controlled by a positioning mechanism circuit 20 that energizes the motor selectively in response to signals transmitted by means which may be conventional from a data source 21 for stepping the carrier upon availability of intelligence for recordal. Typifying a data source is a data channel or a memory, for example, an automated program which may be a prerecorded tape (not shown).

The circuitry of a character generator 22 which may be of known construction is responsive to availability of intelligence in the data source 21 for producing an encoded pulse stream representative of intelligence to be recorded. The thus formed pulses serve to actuate a pulser or laser driver 23 for intermittently energizing the flash tube of laser source 10 whereby an encoded laser output corresponding to stimulating intelligence is serially generated synchronously with the movement of carrier 17.

In accordance with the present invention, carrier 17 comprises a substrate 24 and a colored recording medium 16 carried thereby. In the preferred embodiment, the substrate is transparent or permeable to the energy which will be used to read the record formed in the recording medium. If the substrate is light transparent, it may be fabricated from glass, regenerated cellulose, fused silica, and various plastics including copolymers of acrylic materials, polystyrenes, polyvinyl chloride, polyesters such as mylar, and polyimides. The thickness of the substrate should be sufficient to insure dimensional stability to the finished carrier.

Recording medium 16 which covers one surface 26 of substrate 24 is laser responsive. Which is to say, it is a substance which changes its state in response to the energy output of laser source 10. In accordance with the present invention the recording medium comprises an oxide of a metal or metal alloy. By oxidizing these materials electrolytically, a metal oxide coat or layer can be formed on substrate 24. Aluminum oxide, tantalum oxide and niobium oxide are satisfactory as recording media. However, the aluminum oxide is preferred because it is the least expensive. The layer or coat of the recording medium 16 preferably is less than 0.001 inch thick. Increasing its thickness would be of no value.

The oxide cover is formed by first applying the unoxidized metal or metallic alloy on surface 26 by a process which may be known. For example, if recording medium 16 is aluminum oxide, the aluminum may be applied to surface 26 by vapor deposition in vacuo (sputtering), electron beam deposition, electrolytic deposition, electroless deposition or decomposition of aluminum containing substances. If electro beam or sputtering deposition is used, substrate 24 should be heat stable.

Metals, such as aluminum or tin, heretofore have been used as recording media in laser writing. They can be vaporized responsively to laser output for producing recordings. However, those metals are highly reflective. Accordingly, in such prior processes, portions of the laser energy are not effective for writing, such unused energy being dissipated by reflection. Metal oxides, particularly oxides of aluminum, tantalum and niobium on the other hand, are substantially less reflective and more absorbent than their metal precursors; and form a tough coat which is highly scratch resistant and adherent to the substrate.

In accordance with the present invention, the recording medium is colored complementarily to the color of the laser out-put. This maximizes absorption of laser output. To color the recording medium, oxidation is effected electrochemically or electrolytically (anodically). Anodization is controlled to produce the desired color if the recording medium is tantalum oxide or niobium oxide because those oxides are inherently colored, their hue depending upon the depth of the anodic layer. On the other hand, aluminum oxide requires special treatment to produce the required coloring. To that end, the electrolyte employed in the anodizing process is sulfuric acid. Its use will cause the oxide to acquire a highly porous condition or spongeous form; and as a result adapt the aluminum oxide for adsorbing dyes.

Following formation of aluminum oxide, it is colored by immersion in a dye solution. Suitable dyes generally are soluble in water or alcohol. However, a vehicle for the dye incompatible with substrate 24 should be avoided. The concentration of the dye solution is calculated to provide the greatest energy absorption for the color of the laser output. Methylene blue or malachite green are suitable dyes for absorption of red laser light having a wave length of 6,328 A. Whereas, several well known red dyes may be used for absorption of blue light of 4,550 A. Following the dyeing step, the dye is fixed or locked in, by immersing the dyed oxide in boiling water for a brief period in accordance with known procedure.

Writing is effected by exposing medium 16 between advancing steps of carrier 17 to focused laser output for periods sufficient to form therein an encoded real image or pattern corresponding to encoding of the output of laser source 10. Chromatic laser output is employed because it can be focused to a smaller spot or area than colorless laser output. In consequence intelligence density may be maximized, inasmuch as an area of a focusing spot determines the discrete area of reaction which will enable recording of an intelligence bit. For example, a helium-neon laser produces a red output beam which can be focused to an area with a diameter of 0.633 microns. An argon laser can produce a blue beam which can be focused to a spot having diameter of 0.45 microns. However, said blue output lasers are considerably more expensive than the red output lasers and this factor may affect laser selection. On the other hand, a $CO_2$ laser produces a colorless beam which can be focused to a spot only 10.6 microns. If intelligence density is a consideration, the colorless laser will, of course, be avoided.

Figure 2:
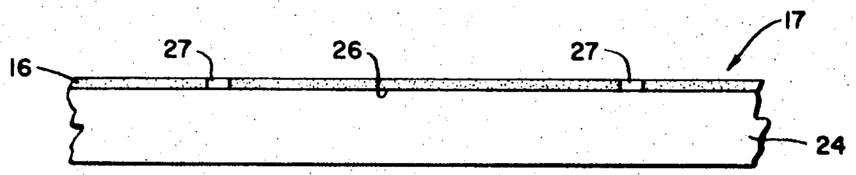
FIG. 2 is a section of a carrier for records embodying a form of the invention.

While the laser output could be used to volatize the recording medium upon which it is focused, as in heretofore known practice, I have found that substantially lower levels of energy than is required for volitilization can be effective for writing. In accordance with the present invention, the exposure required to write or provide a real image need be for a period sufficient, only to provide energy for sintering or vitrifying the oxide in the stop or area 27 (FIG. 2) on which the beam is focused. This change of state produces increased energy permeability, in the recording medium particularly to light, and specifically to laser light, in each sintered or vitrified area or spot 27 compared to the light permeability of the adjoining or unaffected recording medium. The time/intensity ratio of the exposure of the recording medium to laser output will determine whether a writing reaction will occur, which is to say, that the speed at which writing can proceed is determined by the energy required to provide a writing effect. The energy required for writing is dependent upon the material and the dimensions of substrate 24, and the thickness and material of the oxide coat, and its hue and color density.

In consequence of vitrification or sintering, the recording medium changes from an amorphous, porous and spongy state, (its prewritten condition) to an amorphous and glassy state (its condition following writing). During the vitrification or sintering process, the recording medium melts and densifies, but is neither degraded nor destroyed, wholly or partially.

A record generated according to the present disclosure may be read with a laser output. Particularly, it can be read with light from laser source 10, which is less in intensity than the writing intensity, by impinging the reduced intensity output on a photometer after first having passed it through the light permeable spots and substrate 24.

Within the scope of the invention is provision of substrate with a reflective surface 26. Thereby, the record can be read, sensing reflected energy rather than by sensing energy passed through the substrate, as aforesaid. For example, a suitable reflective substrate can be formed by coating glass with a non-oxidizable material, this including at least one of the precious metals, namely, gold, platinum, palladium, and silver. Other reflective materials within the scope of the invention will be apparent to persons skilled in the art.

As many modifications in the described art, construction and process could be conceived, and as many changes could be made therein without departing from the spirit and scope of the claims, it is intended that all matter contained in the accompanying specification shall be considered as illustative only and not in a limiting sense.

I claim:

1. An intelligence transferring process comprising the steps of:

generating a laser output;

focusing the output on a sinterable recording medium consisting entirely of an opaque coating of an oxide selected from the group consisting of aluminum oxide and tantalum oxide on a transparent substrate;

in response to the focused laser output, forming an intelligence pattern by generating a vitrified spot in the oxide coating by sintering the oxide to a transparent state in response to absorption of the focused laser output, the spot having a light permeable state which, in consequence of vitrification, is detectably different from the light permeability of the surrounding material on which the laser was not focused; and then distinguishing the light passing character of the vitrified material in the area where the laser was focused from the surrounding material on which the laser was not focused by sensing the light passing character of the vitrified material.

2. A process according to claim 1, wherein the oxide layer is formed by anodizing a metallic film selected from the group consisting of aluminum and tantalum, and wherein the anodized oxide is colored complementary to the color of the laser beam.

* * * * *